United States Patent [19]

Guthauser et al.

[11] Patent Number: 5,191,070
[45] Date of Patent: Mar. 2, 1993

[54] CONTINUOUS PROCESS FOR THE PREPARATION OF BISAZO PIGMENT MIXTURES

[75] Inventors: Werner Guthauser, Füllinsdorf, Switzerland; Philippe Rohner, Scotland, Switzerland

[73] Assignee: Ciba-Geigy Corporation, Ardsley, N.Y.

[21] Appl. No.: 901,490

[22] Filed: Jun. 19, 1992

Related U.S. Application Data

[63] Continuation-in-part of Ser. No. 564,915, Aug. 8, 1990, abandoned.

[30] Foreign Application Priority Data

Aug. 10, 1989 [CH] Switzerland ............ 2939/89

[51] Int. Cl.[5] ................ C09B 35/037; C09C 7/12
[52] U.S. Cl. .................................. 534/582; 534/576
[58] Field of Search ............... 534/576, 581, 582, 747

[56] References Cited

U.S. PATENT DOCUMENTS

| | | | |
|---|---|---|---|
| 3,529,984 | 9/1970 | Bandel et al. | 106/494 |
| 3,533,818 | 10/1970 | Bandel et al. | 106/494 |
| 3,759,731 | 9/1973 | Kühne et al. | 8/641 |
| 4,159,264 | 6/1979 | Hamilton et al. | 534/584 |
| 4,454,067 | 6/1984 | Behringer et al. | 534/579 |
| 4,720,541 | 1/1988 | Rieper et al. | 534/576 |
| 4,920,206 | 4/1990 | Behringer et al. | 534/582 |

FOREIGN PATENT DOCUMENTS

0451367  5/1968  Switzerland .
1090794  11/1967  United Kingdom .

*Primary Examiner*—Marianne M. Cintins
*Assistant Examiner*—Michael B. Hydorn
*Attorney, Agent, or Firm*—JoAnn Villamizar

[57] ABSTRACT

A continuous process for the preparation of a bisazo pigment mixture of at least two different bisazo pigments of the general formula

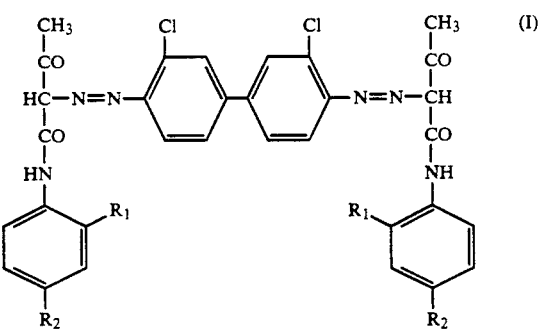

wherein $R_1$ and $R_2$ each may be independent of themselves and are each independently of one another hydrogen, chloro, methyl or methoxy, which bisazo pigments differ from each other in at least one of the substituents $R_1$ or $R_2$, by simultaneously coupling a bisdiazotized diaminodiphenyl (A) of formula

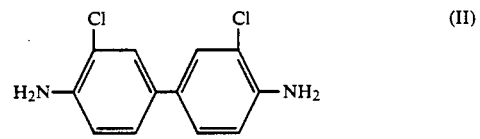

and a mixture (B) of two coupling components of formula

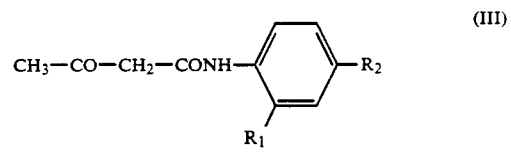

wherein $R_1$ and $R_2$ are each independently of the other hydrogen, chloro, methyl or methoxy which coupling components differ from each other at least one of the substituents $R_1$ or $R_2$, which process comprises mixing continuously the aqueous acidic solution of at most pH 4 of the bisdiazotized diaminodiphenyl (A) with an aqueous alkaline solution of not lower than pH 12 of the mixture (B) of at least two coupling components of formula III which differ from each other as described above in a molar ratio A:B of 1:2.1 to 2.3, keeping the pH in the range from 5.5 to 6.5 by regulating the educt feed, reacting the educts for an average residence time of 1 to 5 minutes, and isolating the resultant pigment mixture by filtration.

The pigment mixtures obtained by this process are distinguished by excellent pigment properties and by surprisingly good rheological properties.

7 Claims, No Drawings

CONTINUOUS PROCESS FOR THE PREPARATION OF BISAZO PIGMENT MIXTURES

This application is a continuation-in-part of application Ser. No. 564,915, filed Aug. 8, 1990, now abandoned.

The present invention relates to a process for the preparation of bisazo pigment mixtures by continuously coupling an aqueous acidic solution of a bisdiazotised diaminodiphenyl with an aqueous alkaline solution of a coupling component mixture. The pigment mixtures so obtained are distinguished by excellent pigment properties and extremely good rheological properties.

As may be seen from Japanese Patent Kokai Sho 48-26 373, it has long been known that the simultaneous coupling of bisdiazotised diaminodiphenyl derivatives with a mixture of acetoacetylanilide derivatives produces bisazo pigment mixtures which have improved pigment properties over corresponding homogeneous products. This Japanese patent publication discloses a discontinuous process for the preparation of bisazo pigment mixtures having a modified crystal structure by reacting an aqueous acidic solution of a mixture of acetoacetyl-m-xylidide and monosubstituted acetoacetylanilide with an aqueous acidic solution of bisdiazotised o-dichlorobenzidine.

It has now been found that a continuous simultaneous coupling of an aqueous acidic solution of a bisdiazotised diaminodiphenyl with an aqueous alkaline solution of a mixture of differently substituted acetoacetylanilides affords bisazo pigment mixtures having excellent pigment properties and surprisingly good rheological properties.

Accordingly, the invention relates to a process for the preparation of a bisazo pigment mixture of at least two different bisazo pigments of the general formula

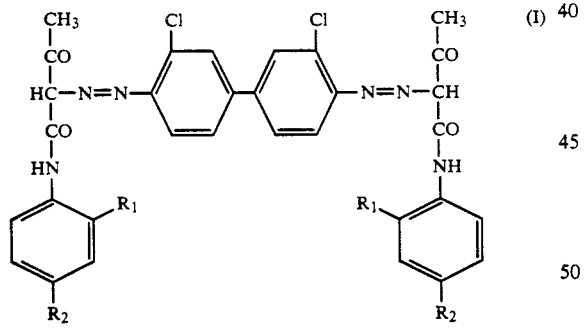

wherein $R_1$ and $R_2$ each may be independent of themselves and are each independently of one another hydrogen, chloro, methyl or methoxy, which bisazo pigments differ from each other in at least one of the substituents $R_1$ or $R_2$, by simultaneously coupling a bisdiazotised diaminodiphenyl (A) of formula

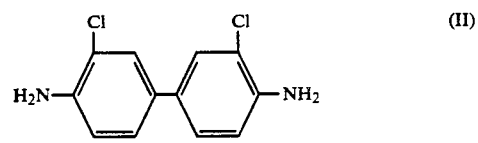

and a mixture (B) of two coupling components of formula

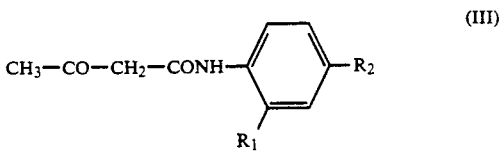

wherein $R_1$ and $R_2$ are each independently of the other hydrogen, chloro, methyl or methoxy which coupling components differ from each other in at least one of the substituents $R_1$ or $R_2$, which process comprises mixing continously the aqueous acidic solution of at most pH 4 of the bisdiazotised diaminodiphenyl (A) with an aqueous alkaline solution of not lower than pH 12 of the mixture (B) of at least two coupling components of formula III which differ from each other as described above in a molar ratio A:B of 1:2.1 to 2.3, keeping the pH in the range from 5.5 to 6.5 by regulating the educt feed, reacting the educts for an average residence time of 1 to 5 minutes, and isolating the resultant pigment mixture of filtration.

The average residence time is preferably from 2 to 3 minutes.

In the process of this invention it is especially preferred to use as coupling component (B) a mixture of coupling components of formula III, wherein $R_1$ and $R_2$ are each independently of the other hydrogen or methyl, which coupling components differ from each other in the significance of at least one of the substituents $R_1$ or $R_2$.

Most preferably, the coupling component mixture (B) used in the process of this invention is a mixture of 65–75 mol % of an acetoacetylxylidide of formula

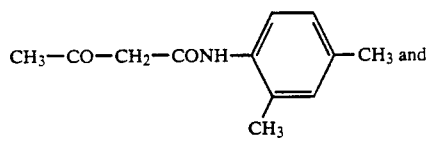

25–35 mol % of an acetoacetylanilide of formula

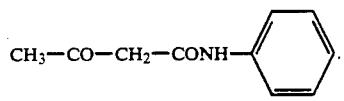

The diaminodiphenyls of formula II and the acetoacetylanilides of formula III are generally known compounds, most of which are commercially available.

The solution of the diazo component (A) is obtained by generally known methods, for example as disclosed in U.S. Pat. Nos. 4,341,701 and 4,648,907.

The solution of the coupling component mixture (B) is prepared by mixing the two coupling components of formula III in the desired ratio and dissolving the mixture, for example in a dilute to concentrated aqueous alkali metal hydroxide solution, conveniently in 30% aqueous sodium or potassium hydroxide solution.

Both solutions, that of the diazo component (A) and that of the mixture (B), are diluted with water to the desired concentration. In the process of this invention, the educt concentration is conveniently 2 to 7, most preferably 4 to 5% by weight.

The term "continuously" means that the diazo component and the coupling component are mixed with each other at substantially the same rate, preferably using a small excess of the coupling component, so that at the time the slurry leaves the reactor, mixing and reaction are largely terminated and there is only a minor excess, or none at all, of one of the components in the slurry over a predetermined excess which is present in one of the streams.

To effect coupling under suitable conditions, the solution of the diazo component and the solution of the coupling components are fed into a single stage reactor having a volume for the required average residence time through two separate lines provided with means for regulating the streams, and conveniently thoroughly mixed, preferably with high turbulence. The slurry so obtained is drawn off through the discharge line after the requisite residence time, and the resultant mixed pigment is isolated by filration.

To ensure thorough mixing, it is desirable to use an agitator which exerts a high shear action, for example that available under the registered trademark ®Turrax (Janke and Kunkel KG, Staufen, FRG), so that the reactants are subjected to a strong shearing force during mixing and the reaction. A means of producing a high turbulence when combining the two solutions is provided by commercially available high-speed impellers such as the ®Ultra-Turrax (Janke and Kunkel KG, Staufen, BRD), the ®Ystral (Ystral GmbH, Ballrechten-Dottingen, FRG), the ®Polytron (Kinematic, Kriens-Luzern, CH) and the ®Silverson mixer (Silverson Mach Ltd., Cheshem/UK) or the ®Chemcol Mixer (Chemiecolor AG, Kilchberg-Zürich, CH).

It is not essential to comminute or grind the product particles, as the rapid and thorough mixing in a relatively small reaction zone will normally suffice to ensure the formation of a homogeneous, finely particulate product.

The rate of addition of the reactants to the reagent solution vessels can be adjusted, for example, by using metering pumps or flow controllers. The coupling reaction can also best be accurately monitored by using an autoanalyzer as described, for example, in U.S. Pat. No. 4,159,264. A minimum excess of coupling component during the coupling reaction is thereby ensured.

The properties of the reaction products, for example filtration properties and the tinctorial and application properties, can be optimised during the synthesis by controlling the pH of the reaction mixture. Control of the pH can be readily carried out in the process of this invention. The pH can be adjusted as required in the reactor by addition of acid or alkali. The addition of acid or alkali can be controlled by means of a pH electrode, for example a brushed electrode mounted in or at the discharge line. However, the pH control can also be carried out in the same reactor as used for the coupling reaction.

The coupling reaction is normally carried out in the temperature range from 0° to 50° C., preferably from 15° to 30° C.

The properties of the pigment mixtures obtained by the process of this invention may be additionally enhanced by the known conditioning techniques described, for example, in U.S. Pat. Nos. 4,341,701, 4,468,907 and 4,729,796.

The invention is illustrated by the following Examples.

EXAMPLE 1 a) Preparation of the solution of the bisdiazo component 420 g (1.2 mol) of 3,3'-dichloro-4,4'-diaminodiphenyl dihydrochloride (ca. 72%) are suspended in 431.2 g (3.78 mol) of technical 32% hydrochloric acid in a 5 liter glass beaker. The suspension is cooled to $-10°$ to $-15°$ C. with an ice bath and by direct addition of ice. With constant stirring, 320 ml (2.46 mol) of a 40% aqueous solution of sodium nitrite are then run in over 1 to 3 minutes, while keeping the temperature of the suspension below 5° C. by addition of ice. Over ca. 30 minutes a marked excess of nitrite must be present. When the reaction is complete, excess nitrite is destroyed by adding 20 ml of 15% sulfamic acid and then 4.2 g of activated carbon and 8.4 g of kieselguhr are added. Stirring is continued for a further 10 minutes at 0°–5° C. After clarifying filtration, the clear reddish brown solution is bulked with ice/water to a weight of 7800 g.

b) Preparation of the solution of the coupling components 344.4 g (1.68 mol) of acetoacetylxylidide (100%), 127.6 g (0.72 mol) of acetoacetylanilide and 331.0 g (2.48 mol) of 30% sodium hydroxide solution are charged to a 10 liter glass beaker. The mixture is bulked with deionised water to a weight of 7800 g and thereafter stirred at room temperature with a magnetic stirrer until a colourless, slightly turbid solution is obtained (ca. 1 hour).

c) Coupling reaction:

368.0 g/min. of the solution of the bisdiazo component prepared according to a) and 404.8 g/min. of the solution of the coupling components prepared according to b) are fed through the first and second feed lines respectively of a 1 liter single stage reactor fitted with three separate feed lines and a discharge line, each provided with a suitable pump, and equipped with a high-speed impeller, and reacted therein at 20°–25° C. for an average residence time of 1.25 minutes. The pH is kept constant at 6.2 by regulating the feed of the educts and/or by addition of a 10% aqueous solution of sodium hydroxide through the third feed line by means of a pH controller provided at the exit of the discharge line. The pigment slurry formed during the above residence time is continuously drawn off through the discharge line, and the pigment mixture is isolated by filtration, washed with water and dried (yield: 96–98% of theory, based on 3,3'-dichloro-4,4'-diaminodiphenyl). In the reaction mixture leaving the reactor, a trace of coupling component, but no bisdiazo compound, can always be detected by means of a spot test.

When incorporated by conventional techniques in an oil-based printing ink, the yellow pigment so obtained has substantially better rheological properties than a pigment prepared by conventional methods but of identical composition (C.I. Pigment Yellow 188-21094), while the good pigment properties remain unchanged.

EXAMPLE 2

(Aftertreatment):

In a 3 liter flask fitted with stirrer, a 10% aqueous solution of sodium hydroxide is added to 1420.0 g of the isolated slurry obtained in Example 1 c) until the pH is 7.0. Immediately afterwards, a warm solution of 70° C. of 40.2 g of hydrogenated abietic acid ((Staybelite Resin ®)) in 250 ml water containing 6.0 g of sodium hydroxide is added.

The mixture is then heated for 1 hour to 95° C. and the pH is adjusted to 6.0 by addition of 2N HCl. Stirring is thereafter continued for 1 hour at 95° C. The temperature is lowered to 70° C. by adding cold water, and the pigment is isolated by filtration, washed with water and dried.

When incorporated in oil-based printing inks, the pigment so obtained has even better pigment and rheological properties than the pigment of Example 1.

What is claimed is:

1. A continuous process for the preparation of a bisazo pigment mixture of at least two different bisazo pigments of the general formula

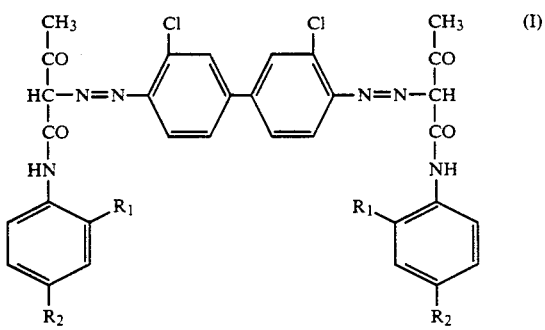

wherein $R_1$ and $R_2$ each may be independent of themselves and are each independently of one another hydrogen, chloro, methyl or methoxy, which bisazo pigments differ from each other in at least one of the substituents $R_1$ or $R_2$, by simultaneously coupling a bisdiazotised diaminodiphenyl (A) of formula

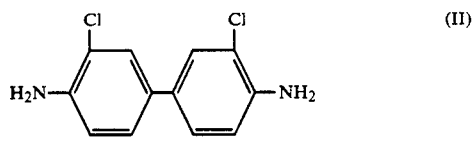

and a mixture (B) of two coupling components of formula

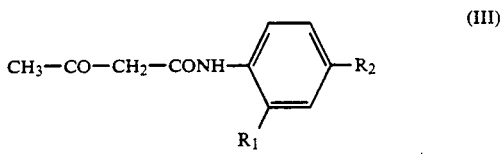

wherein $R_1$ and $R_2$ are each independently of the other hydrogen, chloro, methyl or methoxy which coupling components differ from each other in at least one of the substituents $R_1$ or $R_2$, which process comprises mixing continuously the aqueous acidic solution of at most pH 4 of the bisdiazotised diaminodiphenyl (A) with an aqueous alkaline solution of not lower than pH 12 of the mixture (B) of at least two coupling components of formula III which differ from each other as described above in a molar ratio A:B of 1:2.1 to 2.3, keeping the pH in the range from 5.5 to 6.5 by regulating the educt feed, reacting the educts for an average residence time of 1 to 5 minutes, and isolating the resultant pigment mixture by filtration.

2. A process according to claim 1, wherein the mixture (B) consists of two coupling components of formula III in the molar ratio of 1:9 to 9:1.

3. A process according to claim 1, wherein the coupling component mixture (B) is a mixture of 65–75 mol % of an acetoacetylxylidide of formula

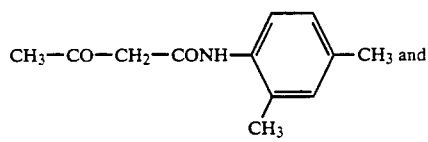

25–35 mol % of an acetoacetylanilide of formula

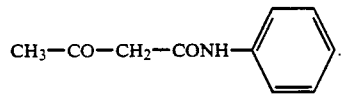

4. A process according to claim 1, wherein the average residence time is from 2 to 3 minutes.

5. A process according to claim 1, wherein the educt concentration is 2 to 7% by weight.

6. A process according to claim 1, wherein the solution of the bisdiazotised diaminodiphenyl component and the solution of the coupling component mixture is mixed with high turbulence.

7. A process according to claim 1, wherein the coupling reaction is carried out in the temperature range from 0° to 50° C.

* * * * *